(12) United States Patent
Meier

(10) Patent No.: US 6,201,969 B1
(45) Date of Patent: Mar. 13, 2001

(54) CONTROL OF HANDOFF IN CDMA CELLULAR SYSTEMS

(75) Inventor: Steven Kent Meier, Batavia, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/088,750

(22) Filed: Jun. 2, 1998

(51) Int. Cl.⁷ .............................. H04Q 7/20; H04B 7/216
(52) U.S. Cl. .................... 455/442; 455/432; 455/436; 370/320; 370/331
(58) Field of Search ................................ 455/422, 432, 455/433, 436, 442, 513, 517, 524, 525; 370/320, 331, 441, 335, 342

(56) References Cited

U.S. PATENT DOCUMENTS

| | | | |
|---|---|---|---|
| 5,267,261 | * | 11/1993 | Blakeney, II et al. ............... 455/442 |
| 5,438,565 | * | 8/1995 | Hemmady et al. .................. 455/442 |
| 5,574,983 | * | 11/1996 | Douzono et al. .................... 455/442 |
| 5,722,074 | * | 2/1998 | Muszynski .......................... 455/442 |
| 5,794,149 | * | 8/1999 | Hoo ..................................... 455/433 |
| 5,901,354 | * | 5/1999 | Menich et al. ...................... 455/442 |
| 5,956,641 | * | 9/1999 | Bruckert et al. .................... 455/442 |

\* cited by examiner

Primary Examiner—Nay Maung
(74) Attorney, Agent, or Firm—Werner Ulrich

(57) ABSTRACT

This invention relates to an arrangement for efficiently providing an up to date neighbor list for base stations serving a wireless cellular telecommunications call. The neighbor list is required by a mobile station measuring signal strengths of signals for surrounding base stations in order to locate base stations from which the mobile station can receive strong signals. When one base station receives a revised neighbor list from another base station, it receives a revised neighbor list from another base station, it receives a time stamp identifying when that revised neighbor list was created. Thereafter, when a request for data from a base station is transmitted, it is transmitted with that time stamp; no neighbor list is returned if the time stamp matches the time stamp stored with the neighbor list of the base station receiving the request.

5 Claims, 4 Drawing Sheets

CONTROL OF HANDOFF IN CDMA CELLULAR SYSTEMS

TECHNICAL FIELD

This invention relates to methods and apparatus for controlling handoff in Cellular Wireless Telecommunications Systems.

PROBLEM

In recent years, one of the most popular types of cellular wireless systems is one based on the use of code division multiple access (CDMA) communications between the cellular mobile station and a base station. The advantage of the CDMA approach is that more voice channels can be accommodated in a given band of radio frequencies than is the case with other types of cellular systems.

All cellular systems that serve mobile stations must be prepared to accommodate a situation wherein a mobile station moves out of the range of the base station that served that mobile station and into the range of another base station. Under these circumstances, the mobile station is "handed off" to the other base station. In the case of CDMA, it has been found desirable to use a soft handoff which includes a period of time when the mobile station is served by two or more base stations, during which time both the mobile station and the mobile switching center select the strongest signal arriving from the base stations. Current systems have arrangements which allow up to six base stations to serve a call simultaneously; this is particularly useful in a situation wherein the mobile station is in hilly terrain, or is driving among many buildings and wherein the buildings or hills interfere with transmission from ones of the base stations serving the call.

A primary base station is usually assigned to control the call, and to analyze measurement information received from the mobile station in order to determine which base stations should be added to serve the call, and which base stations may be dropped from serving the call. The primary base station makes this decision based on measurement information that it receives from the mobile station; the mobile station measures the strength of all neighboring base stations which are serving the call, or which may be called upon to serve the call, as signals from other base stations become stronger and/or as the signals from the serving base stations become weaker.

Each base station maintains a list of neighboring base stations that are potential candidates for serving a call currently being served by that base station. This list contains the identities, network addresses, and other characteristics of each neighboring base station. The base station sends a list of the neighboring base station identities to the mobile station, instructing it to periodically measure the signal strength of each of those neighboring base stations. When the mobile station reports signal strength measurements to the base station, the base station uses the other information in the neighbor list to make a handoff decision and to perform the handoff. When multiple base stations are serving a call, the primary base station needs a full list of neighboring base stations from each of the base stations involved in the call, as well as its own list. When a base station is added to serve the call, the primary base station merge the lists of neighboring base stations from each of the base stations serving the call into a single list, and sends this new combined list to the mobile station. Likewise, when a base station is dropped from serving the call, the primary base station removes the dropped base station's list of neighbors from consideration, and sends a new list to the mobile station containing only the neighboring base stations of those base stations which are still serving the call.

The base stations communicate with each other via data links connected to the mobile switching center serving the base stations. If base stations need to communicate with other base stations served by another mobile switching center, they are interconnected using the data links between the base stations and their respective serving mobile switching centers, plus another data link interconnecting the mobile switching centers.

Each base station's neighbor list is administered by technician input via the mobile switching center. The neighbor list may be changed from time to time, as experience is obtained in recognizing which base stations may serve a mobile station in the primary area served by a base station, as system parameters are adjusted to improve system performance, as additional base stations are added to a system to accommodate system growth, and as traffic or usage patterns in an area change. A primary base station needs to have access to an up-to-date copy of the neighbor lists of all other base stations involved in a call in order to inform the mobile station of the combined list of neighbors to measure, and in order to make handoff decisions. One possible method of making other base stations' neighbor list data available to a primary base station is to download to each base station a copy of the neighbor lists from each of its neighboring base stations. With this method, whenever one base station's neighbor list data was changed by technician input, the MSC would have to ensure that a copy of the updated list was downloaded to all other base stations which needed it. This method has several shortcomings. Since three or more base stations may serve a call at one time, a primary base station may need a neighbor list from another base station which is not its direct neighbor, but is a neighbor of one of its neighbors. This makes it difficult to accurately identify the complete set of neighbor lists that a given base station may need to have. Maintenance of copies of each base station's neighbor list at many neighboring base stations is also complex, especially when neighboring base stations are in different MSCs. An alternate approach, which overcomes these problems, has been implemented by the prior art. In the prior art, when a base station is added to a call, the added base stations transmits its neighbor list to the primary base station with each acknowledgment of a handoff request message. Thus for a given call the primary base station will always receive an up-to-date copy of the neighbor list data from each other base station serving the call.

A problem of the prior art in CDMA cellular telecommunication systems is that the data traffic over the data links interconnecting base stations with mobile switching centers is very high, especially when there are many hand offs occurring during the course of many of the calls.

SOLUTION

Applicant has recognized that much of the traffic that loads the data links is traffic used to provide neighbor list information to base stations involved in a call. The primary base station needs a full list of its own neighboring base stations, and the neighboring stations of all other base stations currently serving the call. In the prior art, this information is provided by transmitting a neighbor list with each acknowledgment of a handoff request message.

The above problem is substantially alleviated, and an advance is made over the prior art in accordance with Applicant's invention wherein each base station builds up a data base of the neighboring cells for other base stations to which it has handed off calls, or from which it has been handed calls, so that if the data base is up to date, it is not necessary to transmit the identity of the neighboring base stations on each call. The validity of the neighbor list of any particular base station is specified by a time stamp which accompanied the most recent update of the neighbor list for that base station. When making a handoff request, the primary base station transmits the time stamp in its handoff request message; if that time stamp is in fact the time stamp of the most recent update of the neighbor list of the base station receiving the handoff request, then that base station need not send a neighbor list for this call. If the time stamp does not match the time stamp of the base station receiving the handoff request message, then that base station transmits its own (home base station) neighbor list, an updated list, back to the primary base station. Advantageously, this arrangement requires that neighbor lists be transmitted only when they have been updated.

In accordance with one feature of Applicant's invention, the time stamps of all stored neighbor lists for other base stations are periodically reset to zero so that any mistakes in these neighbor lists will be cleared by a new response to the first query. In Applicant's preferred embodiment, this reset takes places approximately every fifteen minutes.

In accordance with another feature of Applicant's invention, a plurality of time stamps is sent to a third or higher base station participating in a handoff call. The plurality of time stamps are the time stamps in the primary base station of the neighbor lists stored therein for the other base stations already participating in the call. If the receiving base station has a time stamp, in its own data base for a neighbor list of another base station serving the call, which is less than the received time stamp, then that base station obtains a neighbor list from the base station for which the received time stamp indicates that its own neighbor list data base entry is out of date. Advantageously, this arrangement permits the most recently added base station to have a neighbor list that is at least as up to date as the neighbor list of the primary base station, and therefore, allows that most recently added base station to serve as the primary base station if the signal from the primary base station becomes sufficiently weak that it is undesirable to maintain the primary base station as one of the base stations serving the call.

DETAILED DESCRIPTION

Figure 1:
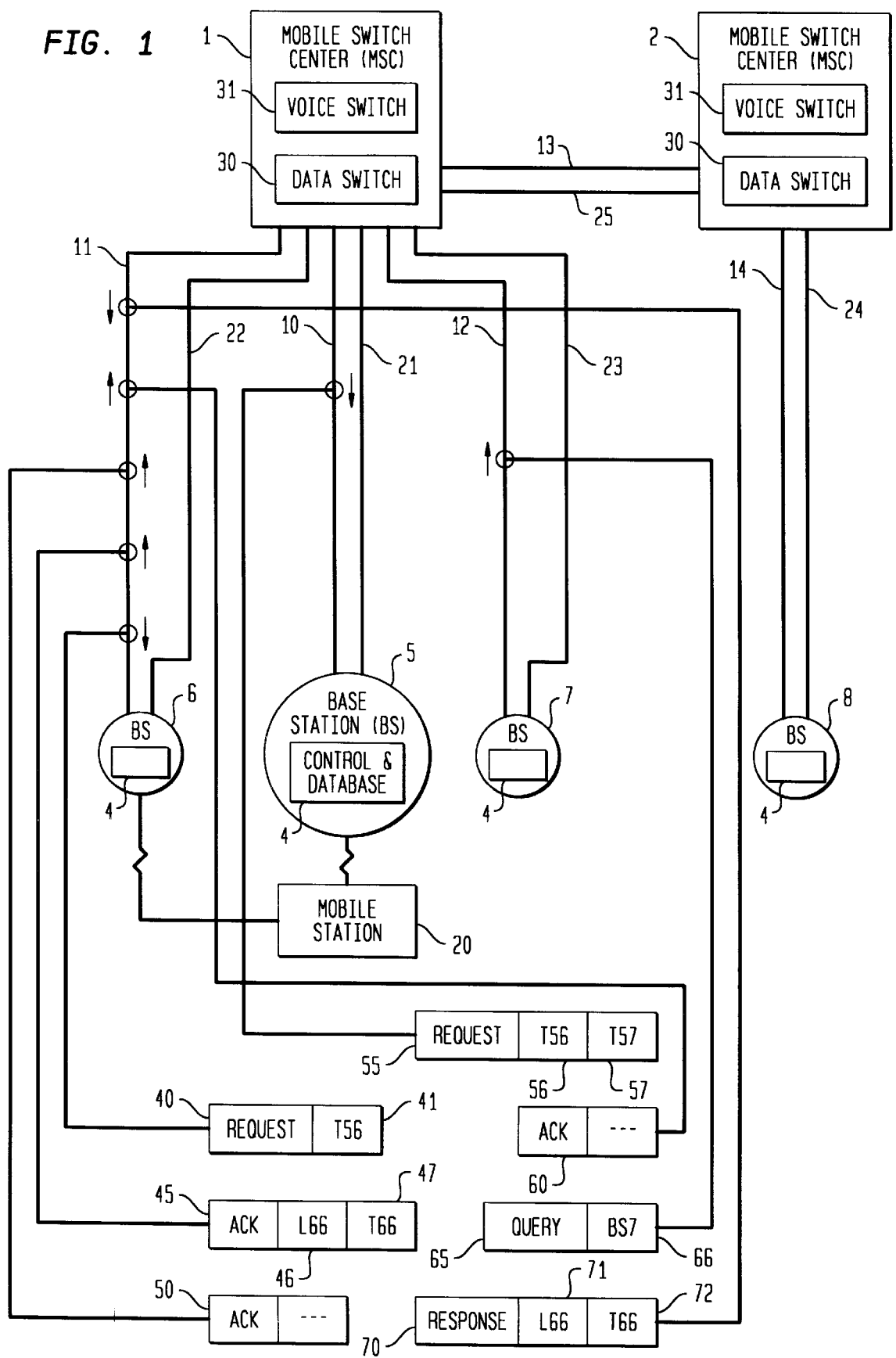
FIG. 1 is a block diagram illustrating a CDMA cellular system.

FIG. 1 is a block diagram illustrating a system for use with Applicant's invention. A mobile station 20 is being served by two base stations, 5 and 6. These base stations, plus a third base station 7, are in turn, served by mobile switching center 1. Each of the base stations is connected to the mobile switching center by a data link (10, 11, and 12, respectively for base stations 5, 6, and 7), and a plurality of user traffic channels for carrying user voice and data, carried over links 21, 22, and 23 for the three base stations. In addition, each base station has a controller and data base 4. The controller, operating under the control of a program, controls operations of the base station; the data base maintains the data of neighbor lists and the time stamp associated with each neighbor list entry. FIG. 1 also shows a second mobile switching center connected to another base station 8 by a data link 14 and a plurality of voice channels, 24. Mobile switching centers (MSCs) 1 and 2 are interconnected by a data link 13 which allows data messages from, for example, base station 5, to be transmitted to base station 8 via data links 10, 13 and 14. MSCs 1 and 2 are also connected by a plurality of user traffic channels 25. FIG. 1 also shows that mobile switching center 1 has a data switch 30 for switching messages received from one of the data links 10, 11, 12 and 13 to another one of these data links, or for terminating such messages in the mobile switching center. The data switch also transmits messages from the mobile switching center to one of these data links. The mobile switching center also has a voice switch 31, for switching voice signals received over one of the voice links 21, 22, 23, and 25 to another of these voice links or to the public switched telephone network 34, and for making the reverse connections.

The messages exchanged between base stations in order to implement Applicant's inventions are messages 40, 45, 50, 55, 60, 65 and 70 on FIG. 1. The notation for these messages is that "T" represents time stamp, "L" represents a neighbor list, and the two digits following a time stamp or neighbor lists represent the identity of the base station storing the time stamp or neighbor list, and the identity of the base station for which the time stamp, or neighbor list is being stored. When the two digits are the same (as in messages 45 and 70) the neighbor time stamp and neighbor list are the time stamp and neighbor list of the base station to which the neighbor list refers, i.e., the home base station.

Message 40 represents a handoff request message. The message is being directed to base station 6, and contains the time stamp of the data for base station 6 as stored in base station 5 (Segment 41). The response is one of the two messages 45, and 50. If the time stamp T-56 indicates up to date data, i.e., if T-56 equals T-66, the latter being the home station time stamp, then message 50 is sent which is an acknowledgment without a neighbor list and time stamp. If T-56 is less than T-66, then message 45 is sent which includes an up to date neighbor list L-66 (Segment 46), and an up to date time stamp, T-66 (Segment 47).

Message 55 is a message for the case in which a third base station is being added to the soft handoff connection. The request message 55 includes the time stamp of the data for base stations 6 and 7 as stored in base station 5 (Segments 56 and 57, respectively). In this case, let us assume that the data for base station 7 in base station 5 is up to date, i.e., that T-57 equals T-77, the time stamp for home station neighbor list data of base station 7. Consequently, the acknowledgment message 60 does not contain a neighbor list and time stamp. However, assume that the time stamp T-56 sent as segment 56 to base station 7 is greater than T-76, the time stamp stored for base station 6 data in base station 7. In that case, base station 7 sends a query message 65, including an identification segment 66 which specifies the requesting base station, to base station 6. Base station 6 responds with message 70 which includes up to date home base station neighbor list data L-66 (Segment 71) and the corresponding time stamp T-66 (Segment 72) to the requesting base station 7.

Note that message 55 did not include time stamp T-55. This is not necessary since the purpose of the multiple time stamp message is to allow the most recently added base station to be able to take over as the primary base station in case the primary base station drops off the call. The primary base station in this example is base station 5, so if base station 5 drops off the call and base station 7 takes over the primary role, it is not necessary for base station 7 to have the up-to-date neighbor list for base station 5 for this call, since base station 5 will no longer be serving the call. Note also that base station 6 does not receive the time stamp message 55, because base station 6 will not take over the role of primary base station if base station 5 drops out of the call since that role will now be assumed by base station 7.

Figure 2:
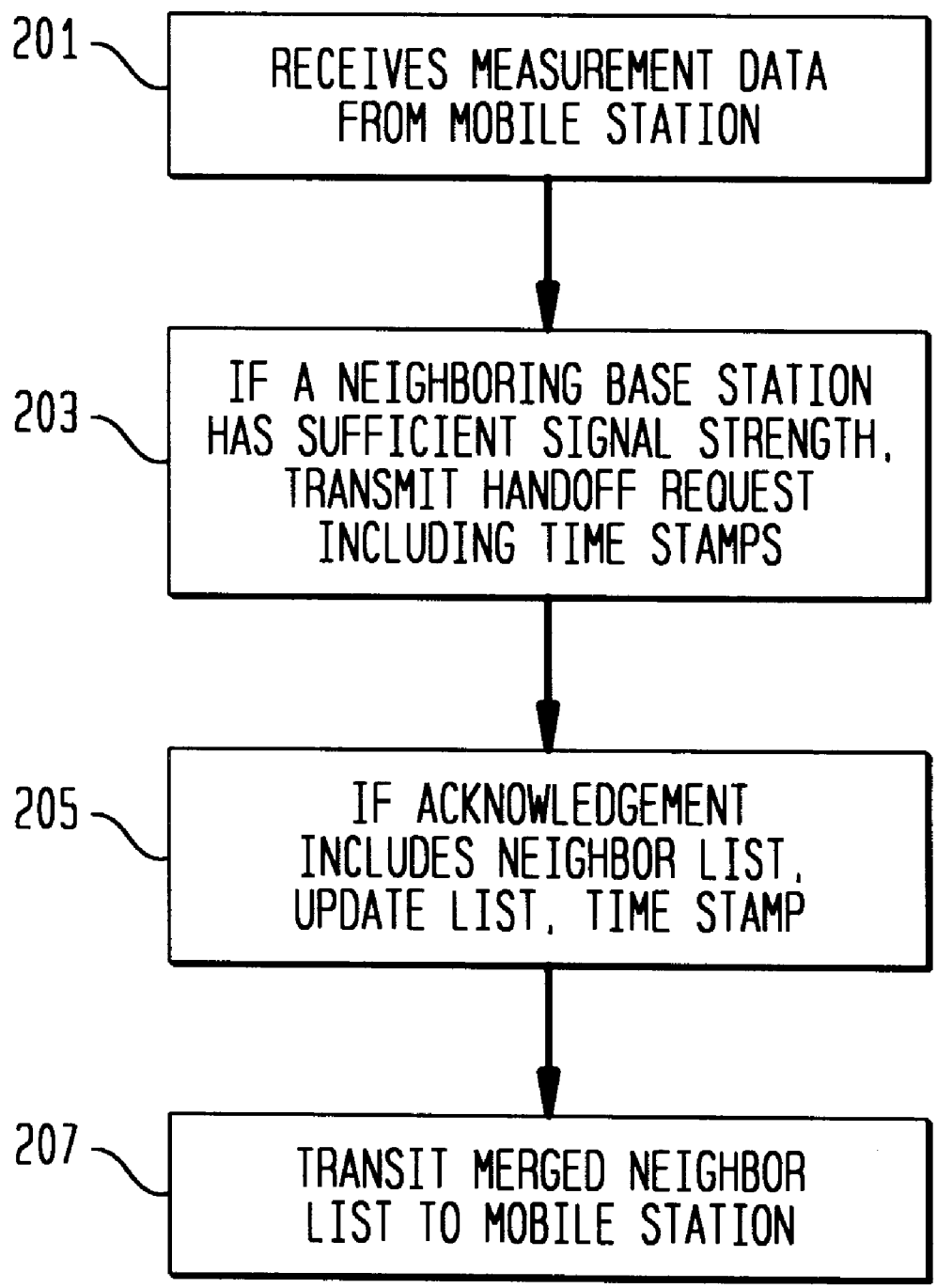
FIGS. 2 through 4 are flow diagrams describing the actions performed with respect to this invention by a primary base station, and a base station being added to serve the call in a handoff situation.

FIG. 2 is a flow diagram illustrating the operations performed in a primary base station. The primary base station receives signal strength measurement data from the mobile station (Action Block 201). The primary base station evaluates the measurement data to determine whether the mobile station is receiving sufficient signal strength from another base station such that the other base station should be added to serve the call. If so, the primary base station transmits a handoff request, including the time stamp stored in the primary base station data base of the neighbor list of the receiving base station (Action Block 203). The primary base station receives an acknowledgment message. If that acknowledgment message includes a neighbor list, then the primary base station updates the neighbor list of the acknowledging base station, and updates the time stamp that was received along with that list (Action Block 205). After completing the handoff, the primary base station merges the neighbor lists of all base stations now serving the call, including the base station just added to the call, and transmits the merged list to the mobile station (Action Block 207).

Figure 3:
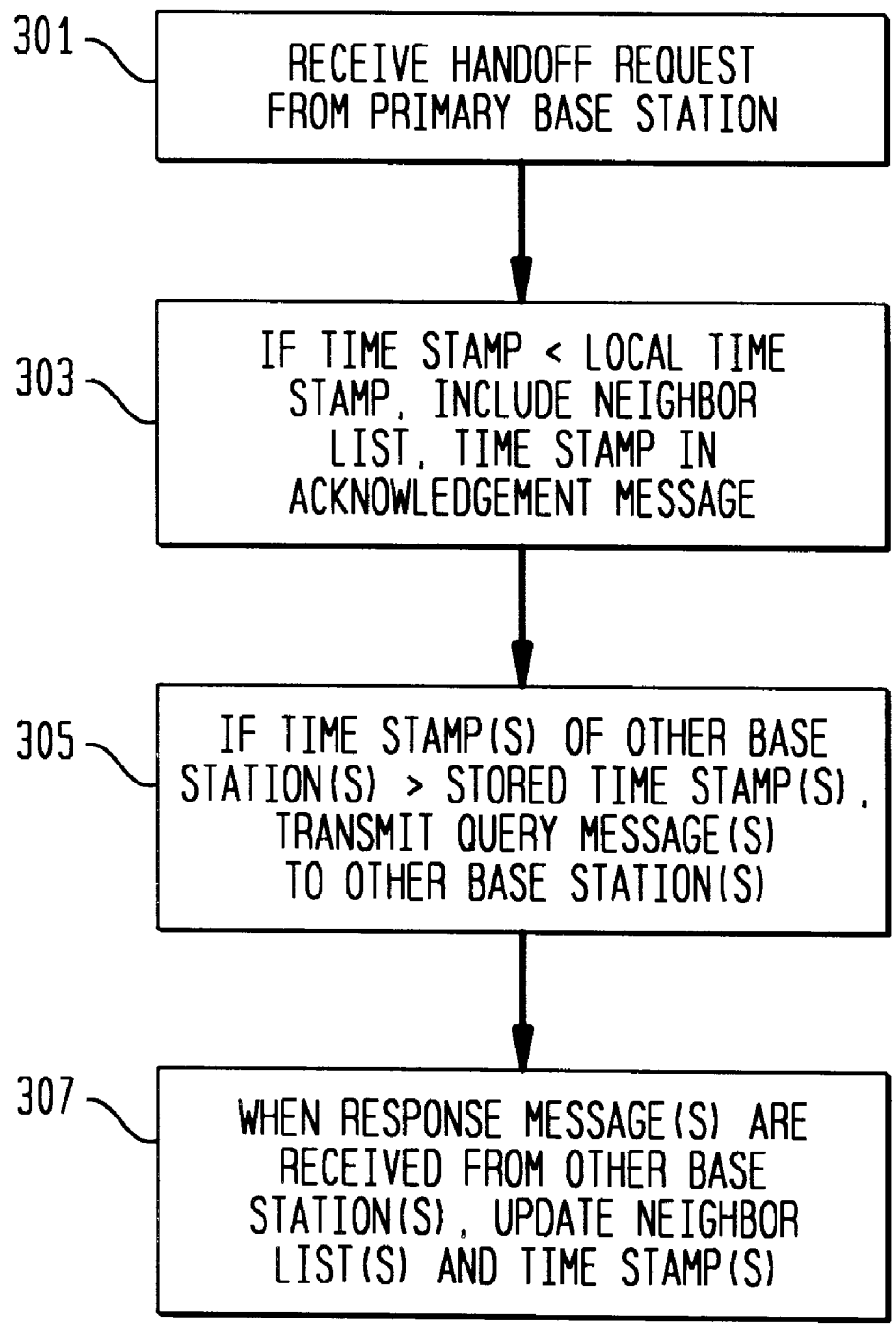

FIG. 3 is a flow diagram illustrating the operations of a base station receiving a handoff request. That base station receives a handoff request from the primary base station (Action Block 301). If the time stamp for the receiving base station is less than the local time stamp for the neighbor list of that receiving base station, then the updated neighbor list and the latest time stamp is transmitted back to the primary base station in the acknowledgment message (Action Block 303). In addition, if the receiving base station is the third, fourth, fifth or sixth base station to be serving the call, then the request message included the time stamps of the other base stations as they were stored in the primary base station. If the received time stamps for other base stations are greater than the time stamps stored for these other base stations, which indicates that the neighbor list information for those base stations is not up to date, then the base station that received the handoff request obtains an updated neighbor list and time stamp (Action Blocks 305 and 307) from those base stations for which its data base is out of date. It receives this by sending a request message requesting an update of the neighbor list and time stamp. The response to the request includes the updated neighbor list and time stamp which is then stored in the requesting base station.

Figure 4:
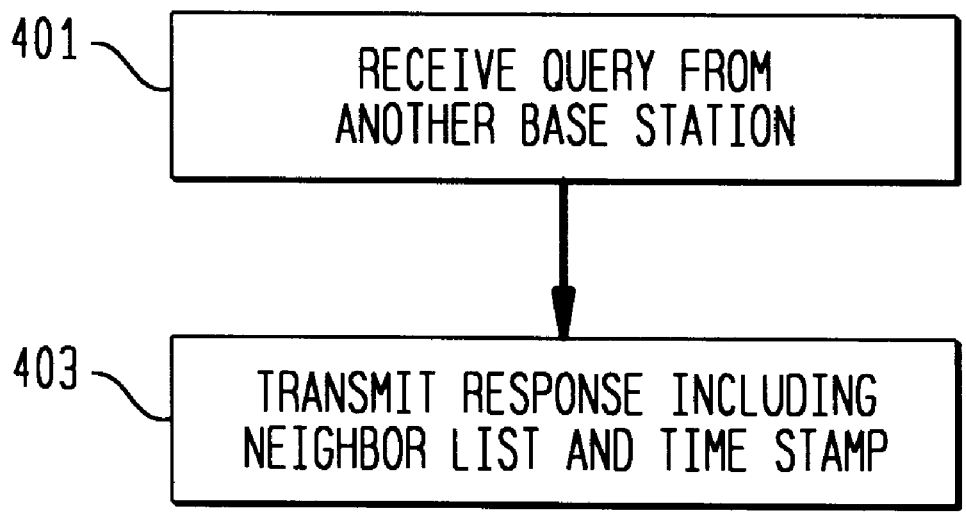

FIG. 4 illustrates the process performed by a base station receiving an inquiry transmitted in Action Block 305 (FIG. 3). The base station receives the inquiry message (Action Block 401). It transmits a response that includes its home neighbor list and the associated time stamp (Action Block 403).

Figure 5:
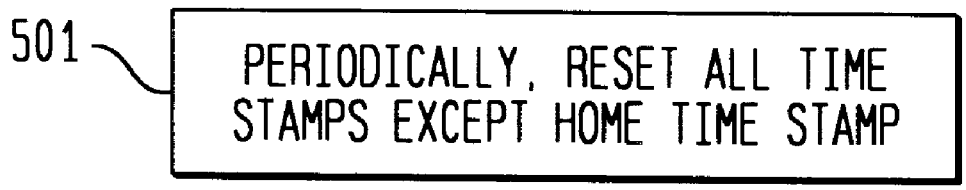
FIG. 5 is a flow diagram of actions performed in each base station to assure the integrity of the neighbor list data base.

FIG. 5 illustrates a feature of Applicant's invention designed to clear errors in the neighbor list data base of each base station. Periodically, the time stamps for each neighbor list other than the neighbor list of the storing base station is reset so that it will subsequently be less than the time stamp of the base station owning the neighbor list (Action Block 501). Thereafter, whenever any primary base station sends a handoff request, or whenever any other base station receives a handoff request containing the time stamps of other base station, the appropriate neighbor list will be updated with the time stamp, and the latest contents of the neighbor list of the owning base station.

The above description pertains to one specific preferred embodiment of Applicant's invention. Many other arrangements will be apparent to those of ordinary skill in the art. The invention is limited only by the accompanying claims.

What is claimed is:

1. In a wireless cellular CDMA telecommunications system, a method of obtaining a neighbor list for a base station being added to serve a call during a soft handoff, comprising the steps of:

storing a neighbor list and an associated time stamp for a plurality of base stations in each base station;

in response to detecting a need for adding another base station for a soft handoff, transmitting a request message comprising a time stamp of a stored neighbor list of the base station to which the request is addressed;

if the base station receiving the handoff request has a time stamp for its own neighbor list that is the same as the time stamp of the received request message, transmitting an acknowledgment that does not include a neighbor list;

if the base station receiving the handoff request has a time stamp for its own neighbor list that is greater than the time stamp of the received handoff request message, transmitting in an acknowledgment message to the base station that sent the request message, a neighbor list and time stamp stored for the base station that is transmitting the acknowledgment message; and in response to receipt of a neighbor list and time stamp in the acknowledgment message, storing that neighbor list and time stamp as a data base entry for the base station transmitting the acknowledgment.

2. The method of claim 1 further comprising the step of:

whenever adding a third or higher numbered base station for simultaneously serving a call, transmitting time stamps of each of the other base stations serving the call to the base station being added;

the base station being added requesting a neighbor list from any base station currently serving the call for which a time stamp in a data base of the base station serving the call is less than the time stamp for that base station received from the primary serving base station, requesting an updated neighbor list from any such base station.

3. The method of claim 2 further comprising the step of:

when the primary base station serving the call is removed from serving the call, assigning the role of primary base station for serving the call to a base station most recently added for serving the call, whereby the new primary base station automatically has an updated neighbor list data base for the call.

4. The method of claim 1 further comprising the step of:

periodically decreasing time stamps of all neighbor lists entries in the data base of a base station except for the time stamp of the home base station neighbor list.

5. In a wireless cellular CDMA telecommunications system, apparatus for a base station comprising:

a database of neighbor lists for a plurality of base stations, each neighbor list entry having an associated time stamp; and means for transmitting and receiving hand-off request messages to and from other base stations;

processor means operative under program control for:
controlling said means for transmitting and receiving;
reading data from said database;
detecting a need for adding another base station for a soft hand-off;
in response to detecting said need for adding another base station for a soft hand-off, controlling transmission of a request message comprising a time stamp of a stored neighbor list of a base station to which the request is addressed, said time stamp being read from said database;
in response to receipt of a hand-off request message comprising a time stamp from said means for transmitting and receiving, reading a time stamp for a neighbor list for said base station from said database;
if the time stamp that is received in said hand-off request message is the same as the time stamp read for its own neighbor list from its own database, controlling transmission of an acknowledgment message from said base station which does not include a neighbor list;
if said time stamp from its own neighbor list is greater than the time stamp of the received hand-off request message, controlling transmission of an acknowledgment message that includes a neighbor list and time stamp stored for said base station; and
in response to receipt of an acknowledgment message comprising a neighbor list and a time stamp, storing the received neighbor list and time stamp in said database as a database entry for the base station transmitting the acknowledgment.

* * * * *